United States Patent
Jeong et al.

(10) Patent No.: US 8,705,400 B2
(45) Date of Patent: Apr. 22, 2014

(54) AUTOMATIC DETECTION OF CHANNEL BANDWIDTH

(75) Inventors: Hyeonkuk Jeong, San Jose, CA (US); Ryan Salsbury, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/543,455

(22) Filed: Jul. 6, 2012

(65) Prior Publication Data

US 2013/0064251 A1 Mar. 14, 2013

Related U.S. Application Data

(60) Continuation of application No. 12/635,759, filed on Dec. 11, 2009, now Pat. No. 8,243,617, which is a division of application No. 10/770,181, filed on Feb. 2, 2004, now Pat. No. 7,653,719.

(51) Int. Cl.
*H04L 1/00* (2006.01)
*H04L 12/28* (2006.01)
*H04J 3/16* (2006.01)
*G06F 15/173* (2006.01)

(52) U.S. Cl.
USPC ....... 370/252; 370/395.41; 370/468; 709/224

(58) Field of Classification Search
None
See application file for complete search history.

(56) References Cited

U.S. PATENT DOCUMENTS

| | | | | |
|---|---|---|---|---|
| 6,438,141 B1 * | 8/2002 | Hanko et al. | | 370/477 |
| 7,106,715 B1 * | 9/2006 | Kelton et al. | | 370/338 |
| 7,180,858 B1 * | 2/2007 | Roy et al. | | 370/232 |
| 7,185,082 B1 * | 2/2007 | del Val et al. | | 709/224 |
| 2001/0044835 A1 * | 11/2001 | Schober et al. | | 709/217 |
| 2004/0246895 A1 * | 12/2004 | Feyerabend | | 370/229 |

* cited by examiner

*Primary Examiner* — Clemence Han
(74) *Attorney, Agent, or Firm* — Park, Vaughan, Fleming & Dowler LLP

(57) ABSTRACT

A step-wise approach to automatically determining the bandwidth of a communication channel includes dividing the channel's potential bandwidth into a number of ranges. An initial range is then selected and a series of data packets specific to the selected range are transmitted from a first endpoint to a second endpoint, with the second endpoint determining one or more channel metrics based on the transmitted packets (e.g., measured transmission rates). If the metrics indicate the current range accurately reflects the channel's bandwidth, a measured transmission rate of the transmitted data packets is used as the channel's bandwidth. Otherwise, another range is selected and the process is repeated. The described approach rapidly determines channel bandwidth, even when the channel between the two endpoints is asymmetric. Techniques described herein are particularly beneficial when used in conjunction with multimedia conferencing applications.

23 Claims, 3 Drawing Sheets

AUTOMATIC DETECTION OF CHANNEL BANDWIDTH

This is a continuation application which claims priority to U.S. patent application Ser. No. 12/635,759 filed Dec. 11, 2009, which is a divisional of U.S. patent application Ser. No. 10/770,181 now U.S. Pat. No. 7,653,719, entitled "Automatic Detection of Channel Bandwidth" which are hereby incorporated by reference.

BACKGROUND

The invention relates generally to network-based computer systems and, more particularly but not by way of limitation, to the automatic detection of bandwidth between computer systems.

As computer system technology and network capacity or bandwidth have improved, communication applications such as multimedia, video and audio conferencing have gained increased use. A significant aspect of these applications is the bandwidth used by the systems (i.e., endpoints) sending and receiving multimedia signals (i.e., video and/or audio and/or data signals) as part of the applications' run-time environment. In general, the greater the bandwidth between two endpoints the better the communications application's performance. Accordingly, it is important from a performance point-of-view to accurately determine the bandwidth between communicating endpoints—a value that is often asymmetric between communicating endpoints. That is, the bandwidth from a first endpoint to a second endpoint may be different from the bandwidth from the second endpoint to the first endpoint. For example, an endpoint coupled to a network via a digital subscriber line ("DSL") typically has a lower transmission bandwidth than a receiving bandwidth.

Prior art systems or applications typically rely on default bandwidth settings and/or query the user at application start-up to identify the bandwidth their local system or endpoint can accommodate. As an initial problem, most users do not know the bandwidth associated with their endpoint system. A second problem is that even if the local bandwidth is "known," its value is only the maximum specified or "ideal" value (e.g., 10 megabits/second, "Mbps") and does not reflect the state of the communications network between the communication endpoints at the time of the communications. Thus, it would be beneficial to provide a mechanism to automatically detect the actual bandwidth between communicating endpoints.

SUMMARY

Techniques in accordance with the invention implement a step-wise approach to automatically determining the channel bandwidth from a first endpoint to a second endpoint. In one embodiment, the method includes transmitting a first plurality of data packets from the first endpoint to the second endpoint. The second endpoint uses the data packets to determine channel transmission characteristics or metrics. For example, the second endpoint may determine transmission rates for each data packet (or specified grouping thereof), the spread or variation of the determined transmission rates, and a representative channel bandwidth value based on the determined transmission rates. In one embodiment, the representative channel bandwidth value is the median value of the determined transmission rate values. The first endpoint sets its first-endpoint-to-second-endpoint channel bandwidth value to equal the representative channel bandwidth value if the channel transmission metrics reflect a bandwidth commensurate with the first channel bandwidth, otherwise the first endpoint transmits a second plurality of data packets to the second endpoint where after the process is repeated until the channel transmission metrics indicate the current channel bandwidth range corresponds to the measured channel bandwidth. At each step or iteration through the above described operations, the size (and perhaps the number) of the data packets transmitted by the first endpoint, increases. In this way, low bandwidth connections may be identified rapidly.

In some embodiments the second endpoint (that is, the endpoint receiving the transmitted plurality of data packets) may determine whether the calculated channel bandwidth corresponds to the current channel bandwidth range. In other embodiments, the second endpoint sends its channel transmission metrics to the first endpoint which then determines whether the calculated channel bandwidth corresponds to the current channel bandwidth range. In addition, both endpoints may perform the same operations such that each endpoint determines its own channel bandwidth. A benefit of this approach is that asymmetries in channel bandwidth between two (or more) endpoints are easily detected.

One of ordinary skill in the art will recognize that methods in accordance with the invention may be embodied in one or more computer programs or routines and placed on a storage medium that may be read by a computer. It will further be recognized by those of ordinary skill that some or all of the techniques described herein may be embodied in computer hardware such as, for example, a custom designed state machine.

DETAILED DESCRIPTION

Techniques (methods and devices) to automatically determine the bandwidth between communicating endpoints are described. The following embodiments of the invention, described in terms of determining the video bandwidth between two endpoints participating in a general purpose computer-based audio-visual conference, are illustrative only and are not to be considered limiting in any respect. For example, the invention is equally applicable to dedicated multimedia conferencing applications and systems. In addition, techniques in accordance with the invention may also be used to determine the available bandwidth between two or more computer systems for purposes other than establishing a video/multimedia conference.

Figure 1:
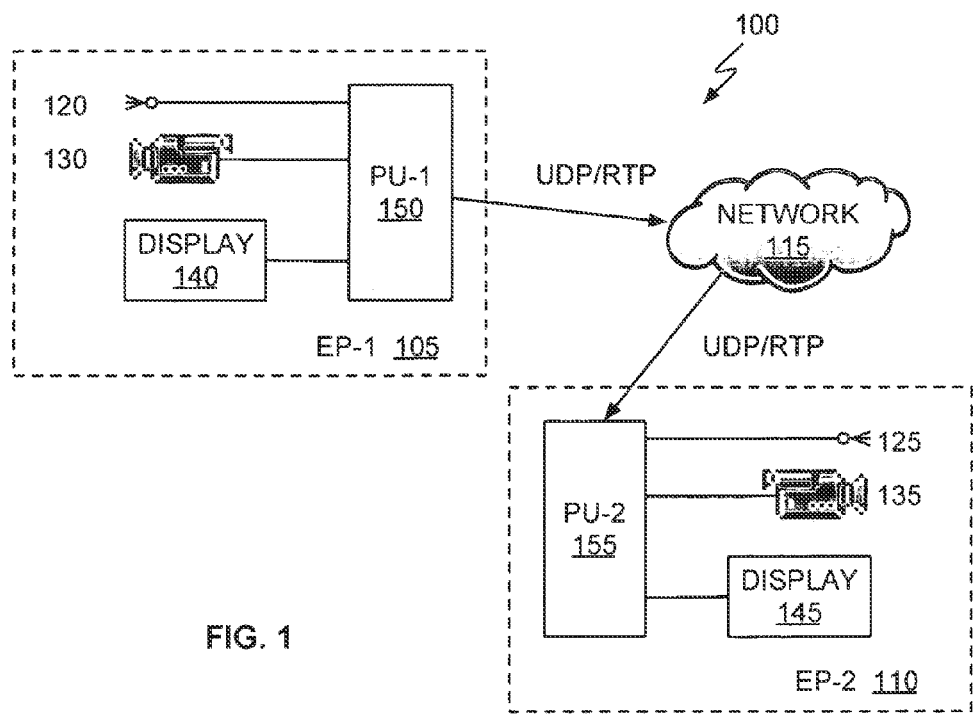
FIG. 1 shows, in block diagram form, a multimedia conference system in accordance with one embodiment of the invention.

Referring to FIG. 1, illustrative multimedia system 100 in accordance with one embodiment of the invention comprises two endpoints (EP-1 105 and EP-2 110) using the User Datagram Protocol ("UDP") and Real-Time Transport Protocol ("RTP") to transmit multimedia content (e.g., audio and video data) over network 115. As shown, each endpoint includes audio input and output devices (120 and 125), video input devices (130 and 135), video display devices (140 and 145)

and processor units (PU-1 150 and PU-2 155). By way of example, endpoints 105 and 110 may be general purpose computers (e.g., desktop or notebook computer systems) or dedicated multimedia conferencing systems. It will be recognized that network 115 may be a wide area network ("WAN") such as the Internet, a local area network ("LAN") or a combination of one or more LANs and one or more WANs. It will be further recognized that connectivity between each endpoint and network 115, as well as portions of network 115 itself, may use any available technology, e.g., wireline or wireless.

As a preliminary matter, techniques in accordance with the invention divide their transmission channel's bandwidth into two or more ranges, with each range having a representative (e.g., maximum) value. As used herein, a "channel" is defined as a directed communication path between endpoints. Referring to FIG. 1 for example, the channel between EP-1 105 and EP-2 110 comprises the path between PU-1 150 and network 115 and between network 115 and PU-2 155. Thus, in one embodiment, a multimedia conferencing application may divide its possible transmission bandwidth into three (3) ranges: range 1 corresponding to a bandwidth typically associated with dialup modems (e.g., less than approximately 60,000 bits per second, "bps"); range 2 corresponding to a bandwidth typically associated with cable modems and DSL upload rates (e.g., less than approximately 500,000 bps); and range 3 corresponding to a bandwidth typically associated with LANs/WANs and DSL download rates (e.g., more than approximately 500,000 bps).

Figure 2:
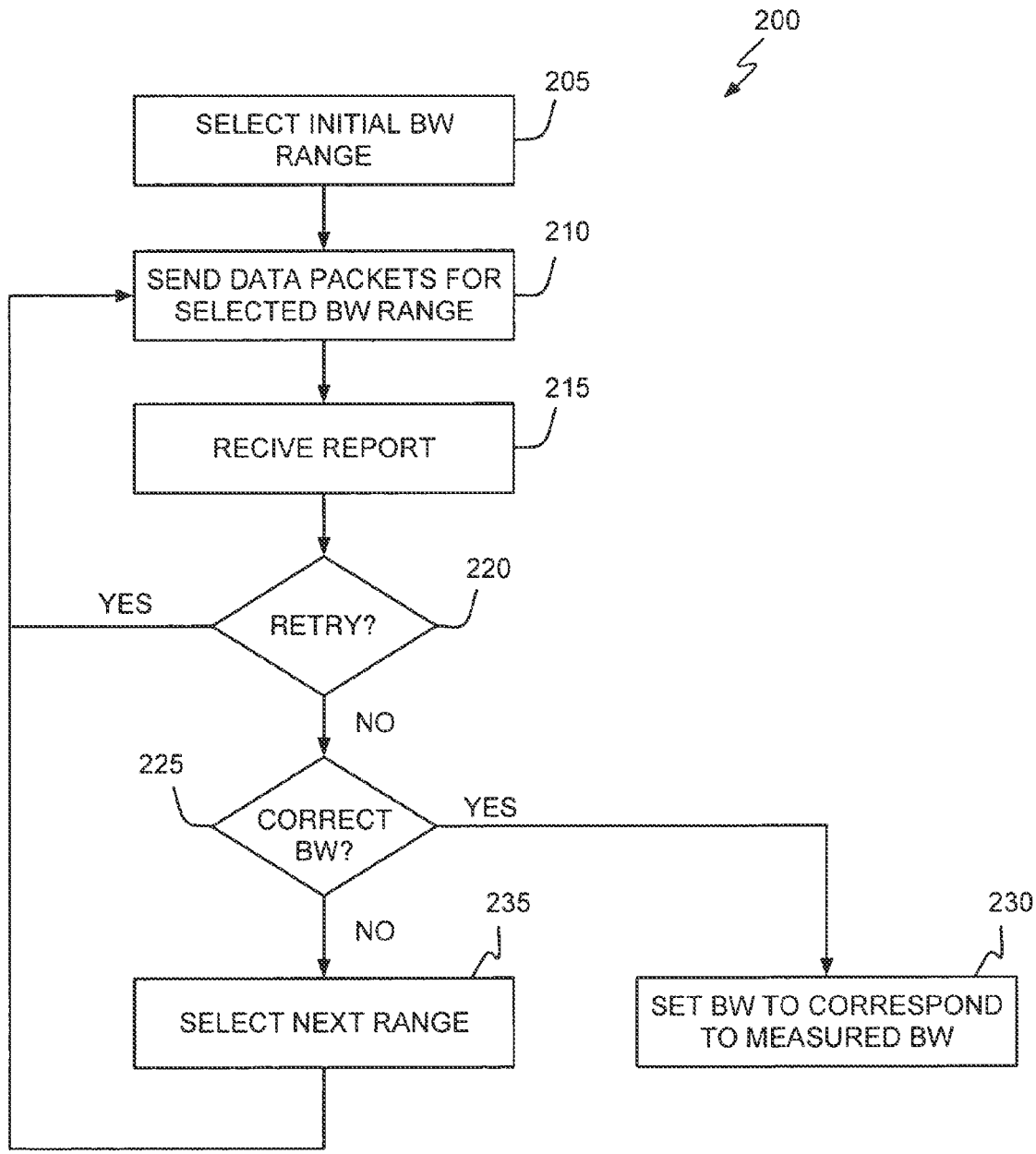
FIG. 2 shows, in flowchart form, one approach to automatically determining a channel's bandwidth in accordance with the invention.

With this background, FIG. 2 illustrates general approach 200 to automatically determine the channel bandwidth from a first endpoint (e.g., EP-1 105) to a second endpoint (e.g., EP-2 110) in accordance with the invention. First, an initial one of the identified ranges is selected (block 205). Typically, the first selected range is the lowest possible range—range 1 as identified above, for example. Next, a series of data packets specific to the selected range are transmitted from the first endpoint to the second endpoint (block 210). In general, transmission of data packets is done as rapidly as possible. That is, without a scheduled pause between individual packets. The second endpoint calculates various transmission metrics based on the received data packets (e.g., mean or median transmission rate and calculated transmission rate variation) and reports this information back to the first endpoint (block 215). To avoid creating an indefinite postponement situation, the first endpoint may reinitiate data packet transmission if a report from the second endpoint is not received within a specified period of time (e.g., 5 seconds). If the second endpoint failed to receive a sufficient number of the data packets (due to dropped and/or corrupted packets, for example), the report will indicate that the data packets should be retransmitted (the "YES" prong of block 220). If the second endpoint received sufficient data packets to reliably calculate the desired channel metrics (the "NO" prong of block 220), the first endpoint determines if the reported bandwidth corresponds to the current range (block 225). If it does (the "YES" prong of block 225), the first to second endpoint's channel bandwidth is set to the measured bandwidth value as reported by the second endpoint via the report received in accordance with the acts of block 215 (block 230). If the metrics indicate that the channel has a bandwidth greater than the current range (the "NO" prong of block 225), the next range is made the current range (block 235), where after processing continues at block 210.

With respect to the acts of block 210, the size and number of packets transmitted during the evaluation of each range may vary. Table 1 summarizes this aspect of the invention for an embodiment using the ranges identified above. To further aid the receiving endpoint, each data packet may also contain the following information: current range identifier (e.g., 1, 2 or 3); packet identifier (e.g., whether the packet is the first, third or tenth packet in the series); total packet count (i.e., the total number of packets being transmitted in the current series); and a block identifier (used by the receiving endpoint during channel metric calculations, see discussion below).

TABLE 1

Illustrative Data Packet Characteristics

| Step | Max. BW (bps) | Packet Count | Size (bytes) |
|---|---|---|---|
| 1 | 60,000 | 12 | 360 |
| 2 | ≤500,000 | 12 | 720 |
| 3 | >500,000 | 15 | 1,450 |

Figure 4:
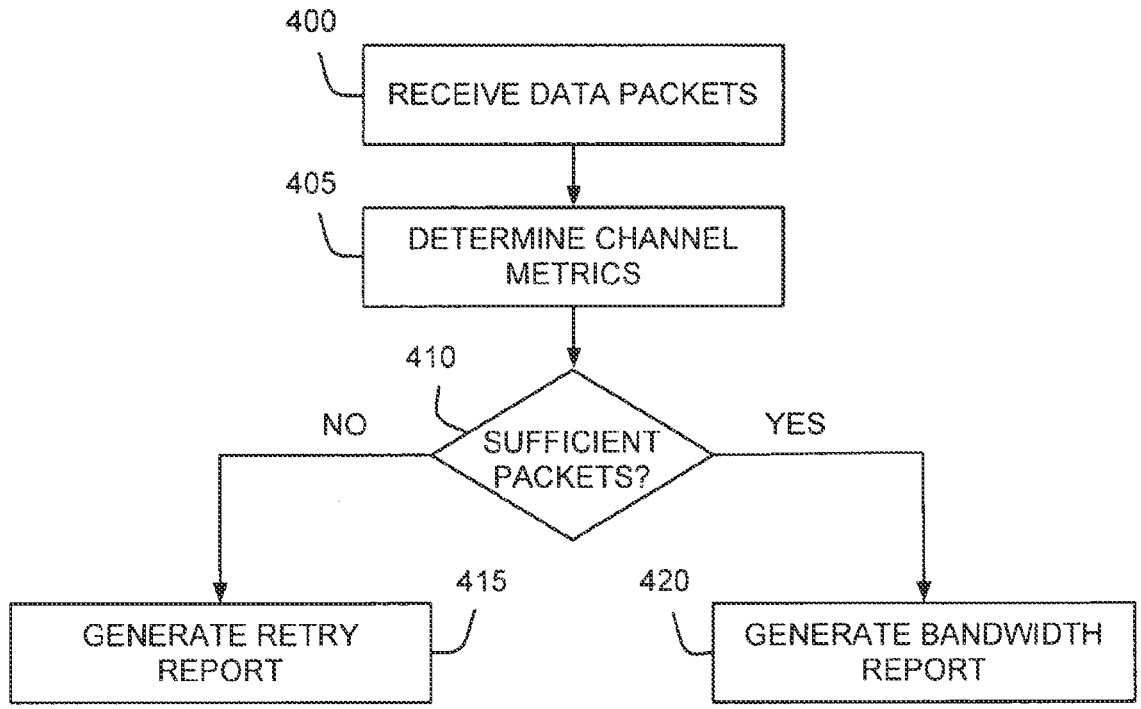
FIG. 4 shows, in flowchart form, a second endpoint's processing of data packets in accordance with one embodiment of the invention.

In one embodiment, once the first endpoint transmits data packets in accordance with the acts of block 210, the second or receiving endpoint performs the actions outlined in FIG. 4. After receiving the first endpoint's data packets (block 400), the second endpoint uses information associated therewith (e.g., size, transmission timestamps and block value—see discussion below) to calculate specified channel metrics (block 405). If the second endpoint fails to receive enough data packets to calculate the desired metrics because of dropped and/or corrupted packets for example (the "NO" prong of block 410), the second endpoint transmits a report packet requesting that the first endpoint retry transmitting the data packets (block 415). While other thresholds are possible, in one implementation if four or fewer relevant data packet samples are received, the second endpoint issues a retry report/packet (see discussion below regarding relevant sized samples). If a sufficient number of data packets are received by the second endpoint (the "YES" prong of block 410), the calculated metrics are returned in a report packet (block 420).

Figure 5:
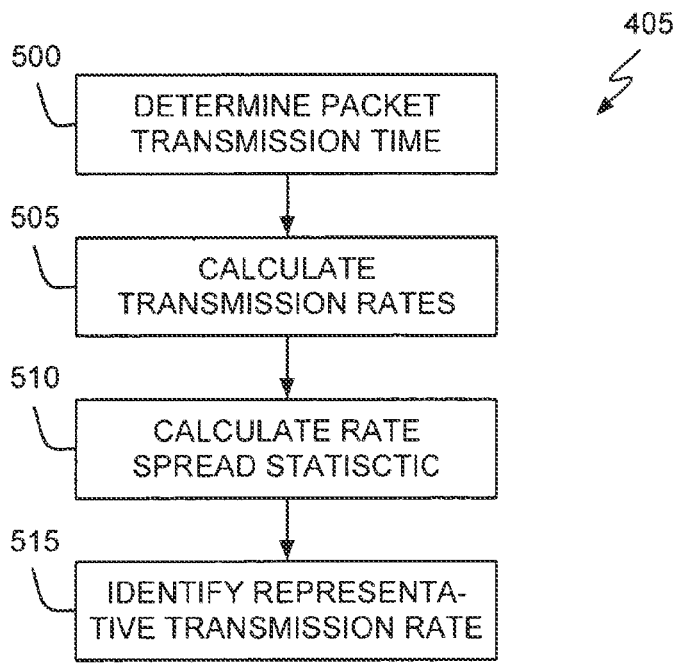
FIG. 5 shows, in flowchart form, channel metrics calculated in accordance with one embodiment of the invention.

FIG. 5 shows the metrics calculated by the second endpoint in accordance with one embodiment of the invention (i.e., block 405). Initially, the second endpoint determines the packet transmission time (block 500) and transmission rates (block 505) at the granularity level specified by the "block" value identified above. As used herein, the block value specifies how many data packets are to be grouped when calculating channel bandwidth metrics. For example, a block value of one (1) means that the size and transmission time of individual data packets are to be used, whereas a block value of five (5) means that consecutive groups of five (5) data packets are to be used when calculating channel metrics. Thus, if "p" represents the size of an individual data packet in bits, "N" the number of data packets transmitted during the acts of block 210 (see FIG. 2), "b" the block value associated with the transmitted data packets, "$T_i$" the transmission time associated with the ith relevant sized sample in seconds (i.e., a sample of "b" consecutive data packets), $t_i$ the arrival time of the ith individual data packet at the receiving endpoint, and "$R_i$" the transmission rate of the ith relevant sized sample in bits per second, then:

$$T_i = t_{b+i} - t_i \text{ and} \qquad \text{Equation 1}$$

$$R_i = \frac{(p \times b)}{T_i}, \qquad \text{Equation 2}$$

where $i: 1 \rightarrow (N-b)$. Next, the standard deviation of the calculated transmission rates (i.e., $R_1$ to $R_{N-d}$) is calculated and normalized to the average sample transmission time (block 510). That is, the calculated standard deviation value is divided by the mean or average transmission time ($T_i$). Finally, the median calculated transmission rate is identified as the representative (i.e., calculated) transmission rate (block 515). It has been determined that the median value, rather than the mean, more accurately reflects the channel's bandwidth as it is unaffected by extremely fast or slow packet delivery times. It will be recognized by those of ordinary skill in the art that other channel metrics and/or techniques for calculating those metrics identified herein are possible without departing from techniques in accordance with the invention.

In one embodiment, reporting to the first endpoint in accordance with the acts of block 420 include transmitting a packet with the calculated transmission rate's standard deviation and representative transmission rate values. The first endpoint would then use these values to determine whether the metrics indicate the current range accurately reflects the channel's bandwidth (i.e., see block 225 in FIG. 2). In another embodiment, the second endpoint uses the calculated metrics to make the same determination—transmitting its determination (e.g., a "go to next range" flag) and representative transmission rate to the first endpoint in a report packet as discussed with respect to block 420. For convenience, the report packet transmitted from the second endpoint to the first endpoint may also include identifying information such as the current range identifier.

One procedure in accordance with the invention to determine whether the current range accurately reflects the channel's bandwidth is outlined in pseudocode in Table 2. (It is noted, that either the first or second endpoint may implement this procedure.) In the implementation describe above with respect to Table 1, the control variables identified in Table 2 were assigned the values given in Table 3.

TABLE 2

Illustrative Range Determination Procedure

| Let | $b_i$ | be the measured (representative) bandwidth during range-i operations; |
| | $B_i$ | be the bandwidth threshold associated with range i; |
| | $s_i$ | be the calculated (normalized) standard deviation of the measured transmission rates during range i-operations; |
| | $S_i$ | be the standard deviation threshold associated with range-i operations; and |
| | $B_L$ | be the bandwidth threshold associated with the lowest range (i.e., $B_L = B_1$) |

IF [$b_i > B_i$] OR [ ($s_i > S_i$) AND ($b_i > B_L$) ] THEN
    Goto the next higher range
ELSE
    Stop

TABLE 3

Illustrative Parameter Values

| Parameter | Range 1 | Range 2 | Range 3 |
|---|---|---|---|
| $B_i$ | 60,000 | ≤500,000 | >500,000 |
| $S_i$ | 0.01 | 0.01 | 0.01 |
| $B_L$ | 60,000 | 60,000 | 60,000 |
| b | 1 | 2 | 5 |

Figure 3A:
FIGS. 3A and 3B illustrate systems, in block diagram form, that can benefit from techniques in accordance with the invention.
Figure 3B:

In summary, techniques in accordance with the invention implement a step-wise approach to automatically determining the bandwidth of a communication channel. One benefit of procedures in accordance with FIG. 2 is that they very rapidly identify which of the predetermined ranges an endpoint's channel supports. Because the lower ranges (associated with lower bandwidths) are generally tested first, a slow connection is quickly detected. It has been found, for example, that detection schemes in accordance with FIG. 2 can identify dialup modem connections in less than two (2) seconds, with LAN/WAN identification taking significantly less than one (1) second. Another benefit in accordance with the invention is that it is robust. That is, because both (or all) endpoints perform the same operations (often at the same time), asymmetries in channel bandwidth may be detected and accounted for. Referring to FIG. 3A, for example, endpoint A 300 uses modem connection 305 to communicate with WAN 310 while endpoint B 315 uses LAN connection 320 to communicate with WAN 310. During bandwidth determination operations in accordance with FIG. 2, both endpoints A and B will identify the available bandwidth as that associated with a modem connection 305—that is, after a single performance of the acts associated with blocks 210-220 (given the ranges identified above). Referring now to FIG. 3B, endpoint C 325 uses DSL connection 330 to communicate with WAN 335 while endpoint D 340 uses LAN connection 345 to communicate with WAN 310. Again, using the three ranges identified above, endpoint C 325 will determine its channel's bandwidth to endpoint D 340 after transmitting two series of data packets (e.g., two passes through the acts of blocks 210-220). Endpoint D 340, on the other hand, will determine its channel's bandwidth to endpoint C 325 after transmitting three series of data packets. Thus, techniques in accordance with FIG. 2 permit each endpoint to efficiently and independently determine the available bandwidth between itself and a target "peer" endpoint.

It will be recognized by those of ordinary skill in the art that various changes in the described systems and components as well as in the details of the illustrated operational methods are possible without departing from the scope of the claims. For instance, the illustrative system of FIGS. 1 and 3 may represent dedicated multimedia systems or general purpose computer systems. Further, in a multimedia conferencing environment, bandwidth detection in accordance with FIG. 2 may be performed prior to, or after, session setup. In addition, acts in accordance with FIGS. 2, 4 and 5 may be performed by a programmable control device executing instructions organized into a program module. A programmable control device may be a single computer processor, a special purpose process (e.g., a digital signal processor, "DSP"), a plurality of processors coupled by a communications link, or a custom designed state machine. Custom designed state machines may be embodied in a hardware device such as a printed circuit board comprising discrete logic, integrated circuits, or specially designed application specific integrated circuits ("ASICs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A channel bandwidth detection method, comprising:
sending a first plurality of data packets from a first endpoint to a second endpoint, where size and number of the first plurality of data packets are based on a first specified channel bandwidth range;
receiving, at the first endpoint from the second endpoint, a first bandwidth range accept value indicating whether transmission metrics associated with the first plurality of data packets corresponds with the first specified channel bandwidth range; and
setting a first-endpoint-to-second-endpoint channel bandwidth value to the first specified channel bandwidth range if the first bandwidth range accept value indicates the transmission metrics associated with the first plurality of data packets corresponds with the first specified channel bandwidth range, wherein at least one of the size and the number of the first plurality of data packets is different from the size and the number of a second plurality of data packets.

2. The method of claim 1, wherein the act of receiving further comprises receiving a first representative bandwidth value associated with the first plurality of data packets.

3. The method of claim 1, further comprises:
receiving, at the first endpoint from the second endpoint, a second bandwidth range accept value indicating whether transmission metrics associated with the second plurality of data packets corresponds with a second specified channel bandwidth range.

4. The method of claim 3, wherein the act of receiving further comprises receiving a second representative bandwidth value associated with the second plurality of data packets.

5. The method of claim 4, further comprises setting the first-endpoint-to-second-endpoint channel bandwidth value to the second representative bandwidth value if the second bandwidth range accept value indicates the transmission metrics associated with the second plurality of data packets corresponds with the second specified channel bandwidth range.

6. The method of claim 3, further comprising:
sending a third plurality of data packets from the first endpoint to the second endpoint if the second bandwidth range accept value indicates the transmission metrics associated with the second plurality of data packets do not correspond with the second specified channel bandwidth range, where the size and number of the third plurality of data packets are based on a third specified channel bandwidth range; and
receiving, at the first endpoint from the second endpoint, a third bandwidth range accept value indicating whether transmission metrics associated with the third plurality of data packets corresponds with a third specified channel bandwidth range.

7. The method of claim 6, wherein the act of receiving further comprises receiving a third representative bandwidth value associated with the third plurality of data packets.

8. The method of claim 7, further comprising setting the first-endpoint-to-second-endpoint channel bandwidth value to the third representative bandwidth value if the third bandwidth range accept value indicates the transmission metrics associated with the third plurality of data packets corresponds with the third specified channel bandwidth range.

9. The method of claim 1, wherein data packets associated with the first specified channel bandwidth range are smaller than data packets associated with a second specified channel bandwidth range if the first specified channel bandwidth range is lower than the second specified channel bandwidth range.

10. The method of claim 1, wherein the first plurality of data packets comprise fewer data packets than the second plurality of data packets if the first specified channel bandwidth range that is lower than a second specified channel bandwidth range.

11. The method of claim 1, wherein the act of sending data packets from a first endpoint to a second endpoint, comprises sending data packets from a first personal computer to a second personal computer.

12. The method of claim 1, wherein the transmission metrics associated with the first plurality of data packets comprise:
transmission rates associated with each of one or more of the first plurality of data packets; and
an indication of a variation between the transmission rates associated with each of one or more of the first plurality of data packets.

13. A channel bandwidth detection method, comprising:
transmitting a first plurality of data packets from a first endpoint to a second endpoint, the first plurality of data packets associated with a first channel bandwidth range;
receiving, at the first endpoint, a first report from the second endpoint including a first plurality of channel metrics based on the first plurality of data packets; and
setting a first-endpoint-to-second-endpoint channel bandwidth value to a value indicated in the first report if the first plurality of channel metrics indicate the first-endpoint-to-second-endpoint channel bandwidth corresponds to the first channel bandwidth range, wherein at least one of size and number of the first plurality of data packets is different from size and number of a second plurality of data packets.

14. The method of claim 13, further comprising:
receiving, at the first endpoint, a second report from the second endpoint including a second plurality of channel metrics based on the second plurality of data packets; and
setting the first-endpoint-to-second-endpoint channel bandwidth value to a value indicated in the second report if the second plurality of channel metrics indicate the first-endpoint-to-second-endpoint channel bandwidth corresponds to a second channel bandwidth range; else transmitting a third plurality of data packets from the first endpoint to the second endpoint, the third plurality of data packets associated with a third channel bandwidth range.

15. The method of claim 13, further comprising:
receiving, at the first endpoint, a third report from the second endpoint including a third plurality of channel metrics based on a third plurality of data packets; and
setting the first-endpoint-to-second-endpoint channel bandwidth value to a value indicated in the third report.

16. The method of claim 15, wherein the value in the third report comprises a median transmission rate, wherein the median transmission rate is selected from transmission rates associated with each of one or more of the third plurality of data packets.

17. The method of claim 13, wherein each data packet comprising the first plurality of data packets is smaller than each data packet comprising the second plurality of data packets if the first channel bandwidth range is less than a second channel bandwidth range.

18. The method of claim 17, wherein a first representative first-endpoint-to-second-endpoint transmission rate comprises a median transmission rate, wherein the median transmission rate is selected from transmission rates associated with each of one or more of the first plurality of data packets.

19. The method of claim 13, wherein the first report comprises a first representative first-endpoint-to-second-endpoint transmission rate and a value indicating a variation between transmission rates associated with each of one or more of the first plurality of data packets.

20. The method of claim 13, wherein a second report comprises a second representative first-endpoint-to-second-endpoint transmission rate and a value indicating a variation between transmission rates associated with each of one or more of the second plurality of data packets.

21. The method of claim 20, wherein the second representative first-endpoint-to-second-endpoint transmission rate comprises a median transmission rate, wherein the median transmission rate is selected from transmission rates associated with each of one or more of the second plurality of data packets.

22. A program storage device, readable by a programmable control device, comprising instructions stored for causing the programmable control device to:

send a first plurality of data packets from a first endpoint to a second endpoint, where size and number of the first plurality of data packets are based on a first specified channel bandwidth range;

receive, at the first endpoint from the second endpoint, a first bandwidth range accept value indicating whether transmission metrics associated with the first plurality of data packets corresponds with the first specified channel bandwidth range; and setting a first-endpoint-to-second-endpoint channel bandwidth value to the first specified channel bandwidth range if the first bandwidth range accept value indicates the transmission metrics associated with the first plurality of data packets corresponds with the first specified channel bandwidth range, wherein at least one of the size and the number of the first plurality of data packets is different from the size and the number of a second plurality of data packets.

23. A channel bandwidth detection device, comprising:

means for sending a first plurality of data packets from a first endpoint to a second endpoint, where size and number of the first plurality of data packets are based on a first specified channel bandwidth range;

means for receiving, at the first endpoint from the second endpoint, a first bandwidth range accept value indicating whether transmission metrics associated with the first plurality of data packets corresponds with the first specified channel bandwidth range; and means for setting a first-endpoint-to-second-endpoint channel bandwidth value to the first specified channel bandwidth range if the first bandwidth range accept value indicates the transmission metrics associated with the first plurality of data packets corresponds with the first specified channel bandwidth range, wherein at least one of the size and the number of the first plurality of data packets is different from the size and the number of a second plurality of data packets.

* * * * *